Oct. 14, 1958 J. N. CARMAN, JR., ET AL 2,856,256

CODED MAGNETIC BINARY RECORDERS

Filed Oct. 31, 1951 2 Sheets-Sheet 1

INVENTORS.
EDWARD W. GOULD,
ARTHUR J. HANNUM,
BY JUSTICE N. CARMAN, JR.
Nicholas T Volk
ATTORNEY.

Oct. 14, 1958 J. N. CARMAN, JR., ET AL 2,856,256

CODED MAGNETIC BINARY RECORDERS

Filed Oct. 31, 1951 2 Sheets-Sheet 2

INVENTORS,
EDWARD W. GOULD,
ARTHUR J. HANNUM,
JUSTICE N. CARMAN, JR.
BY Nicholas T Volk
ATTORNEY.

United States Patent Office 2,856,256

Patented Oct. 14, 1958

2,856,256

CODED MAGNETIC BINARY RECORDERS

Justice N. Carman, Jr., Inglewood, Arthur J. Hannum, Los Angeles, and Edward W. Gould, Reseda, Calif., assignors, by mesne assignments, to Hughes Aircraft Company, a corporation of Delaware Application October 31, 1951, Serial No. 254,174

10 Claims. (Cl. 346—74)

This invention relates to coded magnetic binary recorders, and more particularly, to coded magnetic binary recorders employing a plurality of separately actuable magnetic members for impressing information in the form of binary digits on a magnetic medium by transversely magnetizing discrete areas of the medium.

The magnetic recorder, according to this invention, is particularly applicable for coding computer input information into binary magnetic form, in which form the information may be fed directly into the input-output unit of a conventional binary computer. The coded information, after receipt by the input-output unit, is generally stored in a short access memory device, such as a register, where it is then available for computing purposes by other portions of the computer.

The information, which must be coded into binary form before being usable by the computer, comprises, in general, numbers for computation and order symbols for directing the computer's operations. In the prior art, the coding operation, or in other words, the operation by which the information is coded into a form usable by a computer, generally has been performed by an operator manually punching out the computer input information on a keyboard of a coding device. The coding device automatically codes the input information into binary form and records the resulting binary numbers as perforations in a paper or cloth tape. The perforated tape is then utilized to produce a magnetic pattern on a magnetic medium or track, the magnetic pattern corresponding to the perforated binary numbers. This magnetic track is then fed into the input-output unit of the computer, the magnetically recorded binary numbers thereon being sensed by the unit and serving as the input information for the computer.

The present invention discloses manually actuated devices which automatically code decimal digits and computer order symbols directly into binary number representations in magnetic form on a magnetic medium or track. The magnetically recorded binary numbers on the track may then be fed directly into the input-output unit of a computer without the necessity of performing the intervening operation of converting tape perforations into magnetic form, as has heretofore been necessary. In addition, the particular type of magnetic recording employed in this invention produces a transverse magnetization of the magnetic track rather than the conventional longitudinal magnetization.

If the longitudinal type of recording were employed rather than the transverse recording herein utilized, the output signals produced by scanning the longitudinal recording would contain spurious or undesired signals of the same order of magnitude as the desired signals representing the binary digits. These undesired signals are produced by reason of the fact that the successive binary digits must be recorded along successive areas of the magnetic track, and a uniform flux density to the extreme edges of any area is impossible to attain in longitudinal recording. This lack of uniformity of magnetization of any given area produces undesired output pulses upon the scanning thereof, these undesired pulses occurring in addition to the desired pulses representing binary numbers produced by sensing the change of magnetization occurring between adjacent areas.

By transversely magnetizing each area, as is done by the devices according to this invention, the flux density over a given area is constant and the output signal produced by scanning successive areas thus recorded is substantially free from such undesired output signals. Accordingly, the output signals, produced by scanning the magnetic track according to this invention, are very satisfactory for accurate high-speed input into a digital computer.

The magnetic track, according to this invention, is provided with intermittent longitudinal movement, each binary number being recorded, during a time interval when the track is stationary, on a series of adjacent areas of the track, one area for each place digit of the number. Each area is magnetized in a direction transverse to the direction of movement of the track, the particular transverse direction of the area's magnetization representing the value of its corresponding place digit. Thus, one transverse direction represents one binary digit value, while the other transverse direction represents the other binary digit value. After each binary number is recorded, the track is moved longitudinally a predetermined amount, so that the next group of track areas will be available for recording the next binary number.

According to one embodiment of this invention, the magnetic track is magnetized with a uniform magnetic polarization in one direction transverse to its direction of travel to indicate the binary digit value of 0, and the direction of this magnetic polarization is reversed through any given area to indicate the other binary digit value of 1. This magnetic reversal is effected by contacting the track with a movable permanent magnet whose poles are oriented oppositely to the direction of the uniform magnetic polarization.

According to another embodiment of this invention, a group of electromagnets is energized, the electromagnets being permanently positioned adjacent the track, but aligned transversely thereto. The direction of energization given any electromagnet of the group determines the direction of transverse magnetization impressed on the area of the track immediately thereunder, which, in turn, is determined by the value of the binary digit to be represented thereby.

It is, therefore, an object of this invention to provide a method and apparatus for recording a binary digit on a magnetic track by transversely magnetizing the track in either of two directions, the two directions representing the two values, respectively, of a binary digit.

Another object of this invention is to provide a method and apparatus for recording the successive place digits of binary coded intellegence information on a temporarily stationary magnetic medium by transversely magnetizing successively adjacent areas thereof, respectively, the direction of transverse magnetization of each area representing the value of its corresponding place digit.

A further object of this invention is to provide a method and apparatus for recording the successive place digits of a binary number on successive areas of a magnetic track, respectively, by contacting the areas corresponding to the place digits having one binary digit value with permanent magnets positioned transversely to the magnetic track.

Still another object of this invention is to provide a method and apparatus for recording the successive place digits of a binary number representing either a decimal digit or a computer order signal as successive areas, respectively, of a magnetic track, the recording being done by magnetically polarizing all areas of the magnetic track in one direction and engaging the track areas corresponding to the place digits having the same binary digit value by permanent magnets to reverse the direction of the magnetic polarization of the contacted area, the direction of magnetic polarization of the uncontacted areas representing the other binary digit value.

An additional object of this invention is to provide a method and apparatus for recording the values of the successive binary place digits of a binary number on successive areas, respectively, of a magnetic track by energizing each of a series of electromagnets positioned over said areas, respectively, the direction of energization applied to each of the electromagnets being determined by the binary digit value to be recorded on its corresponding area.

A still further object of this invention is to provide a method and apparatus for coding decimal numbers and computer order symbols into representative binary numbers and recording the values of the successive place digits of each binary number on successive areas, respectively, of a magnetic track by energizing each of a series of electromagnets, one for each track area, in either of two directions for producing two directions, respectively, of transverse magnetization of its corresponding track area to represent the two binary digit values, respectively, the direction of energization of each electromagnet being determined by the value of its corresponding place digit.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Figures 1, 2:
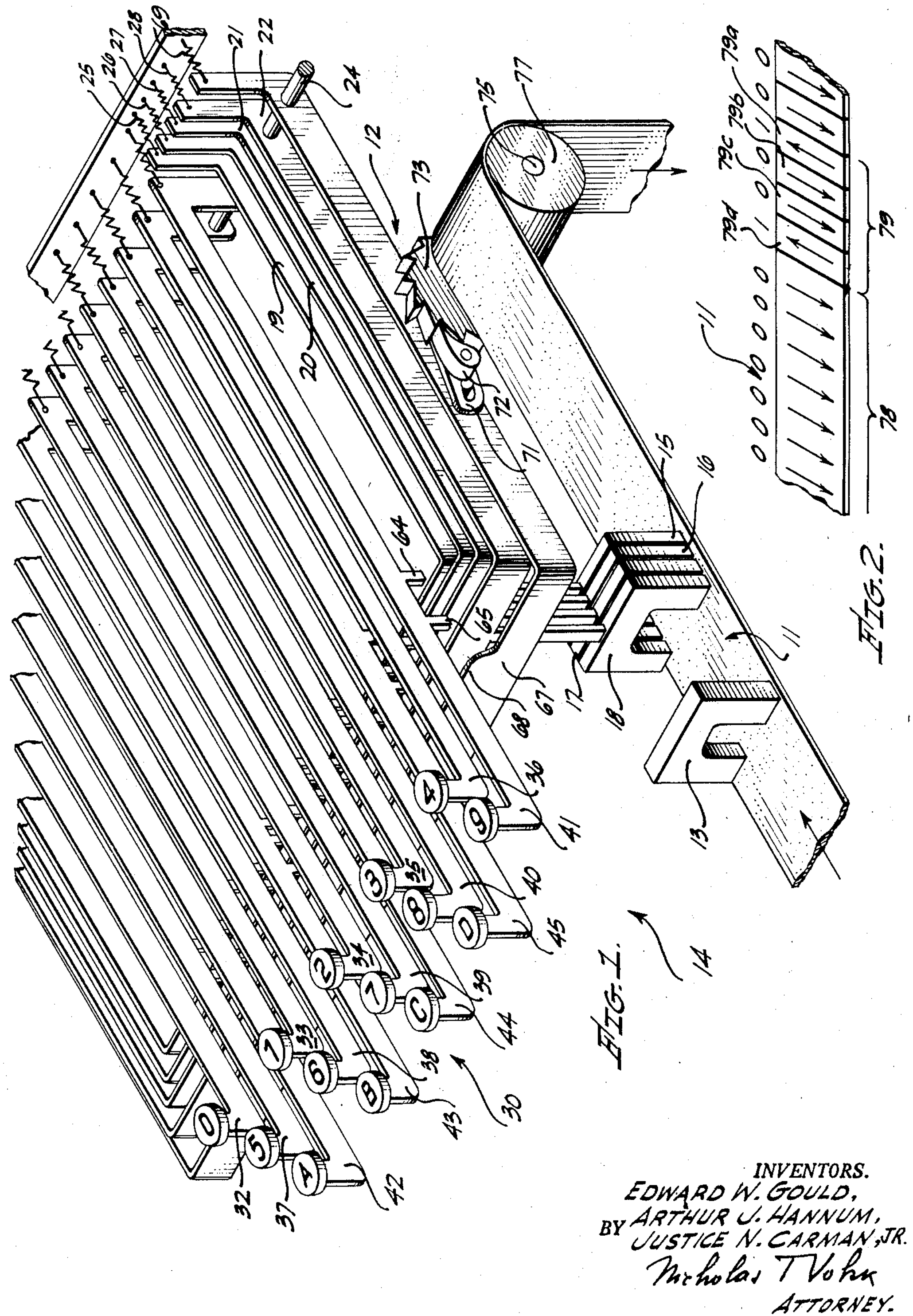
Fig. 1 is a schematic representation of one embodiment of a magnetic recorder according to this invention.
Fig. 2 is a schematic representation of a portion of the track of Fig. 1.

Referring now to Fig. 1, there is illustrated one embodiment of a coded binary recorder according to this invention. The recorder employs permanent magnets and a mechanical linkage system coupled thereto for impressing data in the form of discrete magnetized areas on any suitable magnetic medium, such as a magnetic tape 11. Magnetic tape 11 is provided intermittent longitudinal movement by an indexing mechanism, generally designated 12, in a manner to be described below. Tape 11 is moved by mechanism 12 through the magnetic field produced by a permanent magnet 13, preferably of horseshoe configuration, and receives a magnetic polarization therefrom. The magnetic pole faces of magnet 13 are positioned adjacent tape 11 but are aligned transversely thereto so that the lines of force of the magnetic polarization are oriented perpendicularly to the direction of the tape's travel. Magnet 13 is preferably of sufficient strength to insure magnetic saturation of tape 11.

A group of contiguous writing magnets 15, 16, 17 and 18 are normally spaced from tape 11 but may be individually actuated to contact the tape in a manner to be described later. The writing magnets are identical flat permanent magnets, preferably of horseshoe configuration, which are maintained parallel to one another in serial fashion with their south pole faces in alignment and their north pole faces in alignment. The magnetic pole faces of the respective writing magnets are oriented transversely to the direction of travel of tape 11, as are the pole faces of magnet 13, but are magnetically reversed with respect thereto. Thus, magnet 13 produces a transverse magnetic polarization along tape 11, while each of the writing magnets, when lowered into contact with tape 11, reverses the direction of the magnetic polarization along a length of tape 11 corresponding to the thickness of the magnet.

Writing magnets 15, 16, 17 and 18 are secured to one end of magnet arms 19, 20, 21 and 22, respectively, the other end of each of magnet arms 19, 20, 21 and 22 being freely rotatable about a pivotal bar 24 to allow movement of its associated writing magnet into engagement with magnetic tape 11. Writing magnets 15, 16, 17 and 18 are normally biased out of engagement with tape 11 by any suitable biasing means, such as return springs 25, 26, 27 and 28, respectively, which maintain magnet arms 19, 20, 21 and 22, respectively in their normal position.

A manually actuable keyboard coding system, designated generally by numeral 14, is utilized to depress selected combinations of writing magnets into contact with tape 11 and to initiate action of indexing mechanism 12 upon the subsequent release of the writing magnets. Keyboard 30, as shown, has ten keys, 0, 1, 2, 3, . . . 9 representing the decimal digits 0, 1, . . . 9, respectively, and four order keys *a, b, c, d,* representing four order symbols, respectively.

Keyboard coding system 14 produces a combination coding and writing operation upon the manual depression of a designated key, the key depressed effecting engagement between a selected combination of writing magnets of the writing magnet group and tape 11. The resultant change in the polarized magnetization of the area of tape 11 underlying the writing magnet group provides a binary number representation of the actuated key's designation. In particular, keyboard coding system 14 provides for the conversion of each of the decimal digits 0, 1, 2, . . . 9 into their equivalent binary numbers 0, 1, 10, . . . 1001, respectively. Keyboard 14 also provides for the impression of information other than coded decimal numbers on tape 11, the additional information representing orders to be followed by the computer. For example, order symbols, representing such orders as addition, subtraction, multiplication, error, start, space, etc., may be written on tape 11 as binary numbers of greater magnitude than 1001. According to this embodiment, four order symbol keys are illustrated by way of example, the particular orders represented thereby being determined by the operations to be performed by the particular computer. In particular, the order symbol keys *a, b, c* and *d* are coded into binary numbers 1010, 1011, 1100 and 1101, respectively, to represent four orders, respectively.

Writing magnets 15, 16, 17 and 18 correspond to the values of the first, second, third, and fourth place digits, respectively, of the four place binary number representing each decimal digit or order symbol. When the value of a particular place digit of a binary number is 1, an engagement is effected between its corresponding writing magnet and tape 11, the resulting reversal of direction of the magnetic polarization of the area of tape 11 underneath the writing magnet so actuated representing the binary digit 1. On the other hand, if the value of a particular place digit is 0, the writing magnet corresponding thereto is not actuated and the retention of the magnetic polarization on the tape area underneath the unactuated writing magnet represents the binary digit. 0.

The decimal digit keys 0, 1, 2, 3, . . . 9 are secured to one end of key arms 32, 33, 34, . . . 41, respectively, and the order keys *a*, *b*, *c*, and *d* are secured to one end of key arms 42, 43, 44 and 45, respectively. The other end of each of the key arms 32, 33, . . . 45 is rotatably mounted about pivotal bar 24, and springs are coupled to the other ends to bias the respective key arms upwardly away from the magnet arms.

Each key arm, except key arm 32, corresponding to the decimal digit 0, has a leg or legs secured thereto and so positioned that, when the associated key arm is depressed, they contact and rotate a selected combination of magnet arms. The writing magnets of the magnet arms thus contacted correspond to the binary digit places having the value 1 of the binary number representing the decimal digit or order symbol of the crossbar's corresponding key. For example, key arm 41, secured to key 9, has a first leg 64 overlying magnet arm 19 and a second leg 65 overlying magnet arm 22. Thus, when key 9 is depressed, the first and fourth place digits' writing magnets 15 and 18, respectively, are actuated, and the binary number 1001 is recorded on tape 11, binary number 1001 being equivalent to the decimal digit 9. The legs on the remaining key arms are located so that each decimal digit and order symbol key, when actuated, effects engagement between proper writing magnets and tape 11 so that the binary number written on the tape represents the designation of the key thus actuated. Key arm 32, secured to key 0, contains no legs for engaging the magnet arms since its equivalent binary number is 0000.

Indexing mechanism 12 is coupled between the keyboard coding system 14 and magnetic tape 11 for providing intermittent longitudinal movement of the tape, the tape's movement occurring after actuation of each key. Indexing mechanism 12 includes an indexing arm 67 similar to the various magnet arms, which is pivotally mounted to pivot bar 24 and biased upwardly by spring 69. Indexing arm 67 includes a raised portion 68 extending beneath the various key arms whereby arm 67 is rotated in a counter-clockwise direction each time a key of keyboard 14 is depressed. One end of a lever 71, carrying a pawl 72 intermediate its length, is mounted on indexing arm 67. Pawl 72 engages the teeth of a ratchet wheel 73, wheel 73 being mounted integrally with a shaft 75. The other end of lever 71 is rotatable about the axis of shaft 75, and a drive roller 77, which frictionally engages and drives magnetic track 11, is secured to shaft 75.

When indexing arm 67 is rotated owing to depression of one of the keys, its movement is transferred into a corresponding rotational movement of lever 71 about shaft 75. This movement of lever 71 causes pawl 72 to disengage the tooth on ratchet wheel 73 which it has been contacting and engage the next consecutive tooth located counter-clockwise thereto. The subsequent release of the depressed key permits return spring 69 to rotate indexing arm 67 upwardly about pivotal bar 24 to its normal position. This upward movement of indexing arm 67 swings lever 71 and pawl 72 with it, pawl 72 rotating ratchet wheel 73 and shaft 75. The rotation of shaft 75 rotates drive roller 77 and advances magnetic tape 11. The longitudinal distance tape 11 is moved by each actuation of indexing arm 67 should equal the thickness of the writing magnet group measured along the length of the tape in order that each binary number be recorded on a separate section of tape 11.

In operating the device, the operator records information on magnetic tape 11 by sequentially pressing the desired keys of keyboard coding system 14. Each key thus actuated causes contact to be made between a selected combination of writing magnets and tape 11, tape 11 being maintained stationary for the contact interval. The particular magnets thus actuated effect a reverse orientation of the magnetic polarization on the tape areas contacted thereby to indicate the binary digit value of 1, the direction of the magnetic polarization of the areas under the unactuated magnets indicating the other binary digit value of 0. The actuation of each key also effects a rotational movement of indexing arm 67 by reason of the raised portion 68 on indexing arm 67. On the operator's release of each key thus depressed, the engaged magnets are returned to their normal position by action of the return springs and ensuing movement of the tape is effected by the action of indexing mechanism 12 through the counter rotation of indexing arm 67.

Fig. 2 illustrates, schematically, the lines of force of the magnetization pattern applied to tape 11 by the group of writing magnets upon actuation of key 9. The area of tape 11, designated by 78, illustrates the direction of the magnetic polarization applied thereto by polarizing magnet 13, while the area of tape 11 designated by 79 represents the change of the magnetic polarization effected by the actuation of key 9. Thus, the direction of magnetization of the first and fourth areas **79*a* and 79*d*, respectively, of area 79 has been reversed from the direction of magnetic polarization by reason of the contact made between areas 79*a* and 79*d* and writing magnets 15 and 18, respectively. The areas 79*b* and 79*c*, underlying writing magnets 16 and 17, respectively, retain the magnetic polarization inasmuch as writing magnets 16 and 17** were not actuated by the depression of key 9.

Figures 3, 4, 5:
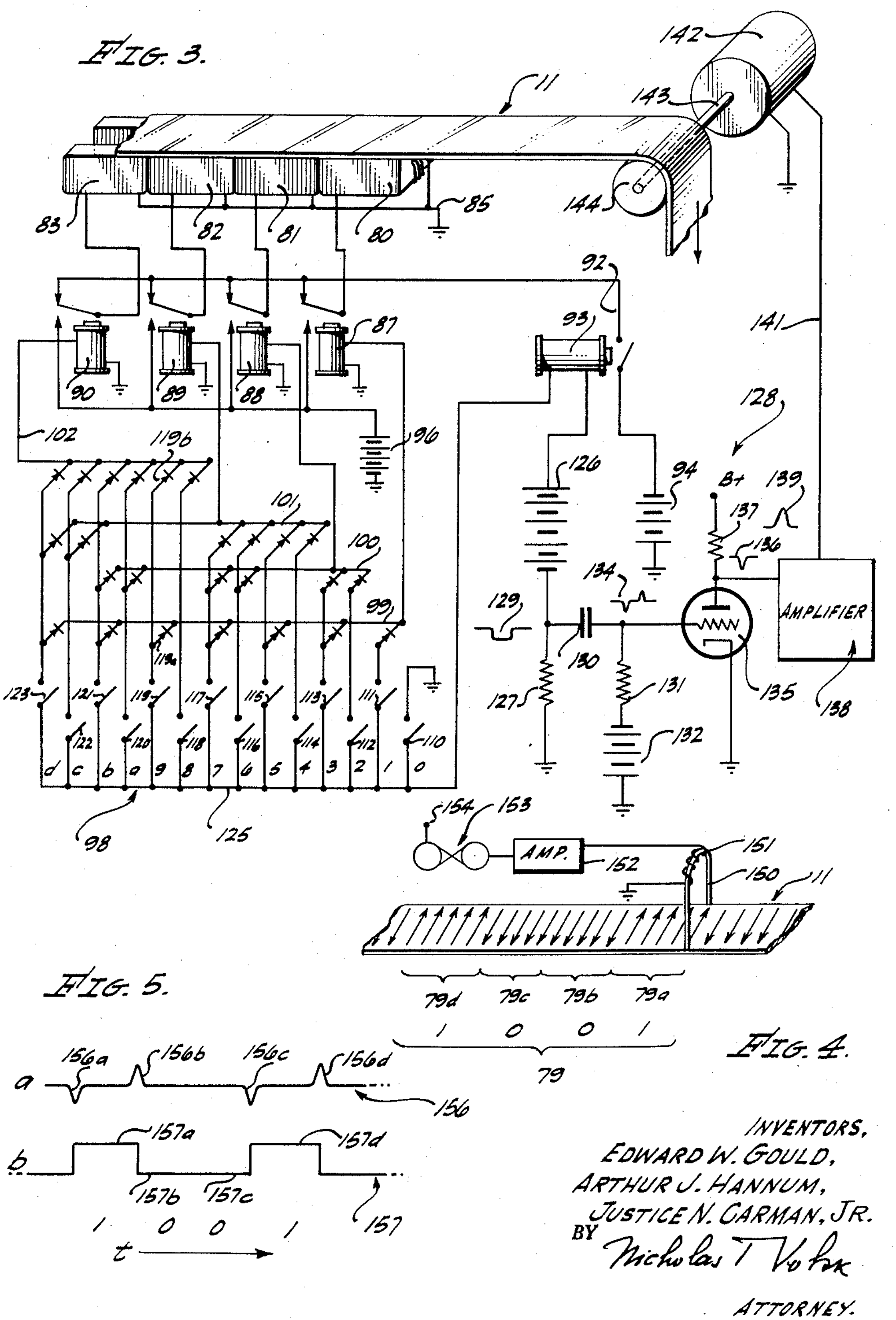
Fig. 3 is a schematic representation of another embodiment of a magnetic recorder according to this invention.
Fig. 4 is a partly schematic and partly block diagram representation of a device for reproducing the signals recorded by the embodiments of Figs. 1 and 3.
Fig. 5 is a diagram of waveforms of electrical signals appearing at two points in the device according to Fig. 4.

Referring now to Fig. 3, there is illustrated another embodiment of the magnetic binary recorder according to this invention which is similar to Fig. 1, but which employs electrical rather than mechanical means for effecting a binary magnetic representation of decimal digits and order symbols on tape 11. Tape 11 is initially nonmagnetized in this embodiment, and is provided with intermittent longitudinal movement, by a stepping motor 142, past a group of contiguous electromagnets 80, 81, 82 and 83. The pole faces of each of the electromagnets are aligned transversely to the direction of movement of tape 11. Electromagnets 80, 81, 82 and 83 are preferably of identical horseshoe configuration and are permanently positioned adjacent tape 11 with their corresponding pole faces in alignment. The electromagnets contain identical energizing coils, each of the energizing coils having a pair of input terminals and being capable of producing a transverse magnetization of tape 11 in either of two directions as determined by the direction of current flow therein. As was the case in Fig. 1, the two transverse directions of magnetization represent the two binary digit values, respectively. Electromagnets 80, 81, 82 and 83 record on tape 11 the first, second, third and fourth place digits, respectively, of the binary number representing the decimal digit or order symbol to be recorded.

The corresponding input terminals of the energizing coils associated with electromagnets 80, 81, 82 and 83, are connected to a grounded bus 85, while the other input terminals of these energizing coils are connected to the armatures of relays 87, 88, 89 and 90 has, in addition to an armature, a relay coil and upper and lower contact points, the armature being biased by any suitable means, not shown, to normally contact the upper contact point. The upper contact points of relays 87, 88, 89 and 90 are connected to bus 92, which, in turn, is connected to a contact point of a relay 93. Relay 93 contains a normally-open armature which is adapted to engage its contact point upon energization of its relay coil. The armature of relay 93 is connected to the negative terminal of a source of direct-current potential, such as a battery 94, the positive terminal of battery 94 being grounded. The lower contact points of relays 87, 88, 89 and 90 are connected to the positive terminal of another source of direct-current potential, such as a battery 96, the negative terminal of battery 96 being grounded.

Each of the relay coils of relays 87, 88, 89 and 90 contains a pair of input terminals, one of the input terminals being grounded and the other input terminal being connected to an electronic coded keying system generally designated 98. In particular, the other input terminals of the relay coils of relays 87, 88, 89 and 90 are connected to relay busses 99, 100, 101 and 102, respectively, of keying system 98.

Coded keying system 98 includes normally-open coding switches 110, 111, . . . 119 corresponding to the decimal digits 0, 1, 2, . . . 9, respectively, and further includes normally-open coding switches 120, 121, 122 and 123, corresponding to the order symbols *a*, *b*, *c*, and *d*, respectively, as discussed in the description of the embodiment of Fig. 1. These coding switches are equivalent to the keys illustrated in Fig. 1 and are adapted for manual operation. Each coding switch contains a movable switch arm connected to a bus 125, which, in turn, is connected to one input terminal of the relay coil of relay 93, the other input terminal of the relay coil of relay 93 being connected to the positive terminal of a battery 126. The negative terminal of battery 126 is connected to ground through a resistor 127.

The fixed contact points of switches 111, 112, . . . 123 are connected to various relay busses through individual diodes so arranged as to provide the necessary coding operation. The fixed contact point of coding switch 110, corresponding to the decimal digit 0 is connected directly to ground and its actuation produces only a current flow from battery 126 through resistor 127 and the relay coil of relay 93.

As has been stated, electromagnets 80, 81, 82 and 83, associated with relays 87, 88, 89 and 90, respectively, record the binary digits of the first, second, third and fourth places, respectively, of the binary number representing the decimal digit or order symbol to be recorded. If the value of the binary digit of a particular place is 1, then a diode is connected from the contact point of the coding switch representing that decimal number to the relay bus connected to the relay associated with the electromagnet of the particular place digit. On the other hand, if the value of the binary digit is 0, then no such diode connection is made.

For example, the contact point of coding switch 119, representing the decimal digit 9, is connected by diodes **119*a* and 119*b* to relay busses 99 and 102, respectively, which, in turn, are associated with relays 87 and 90, respectively. Upon closing coding switch 119, a current flow from battery 126 through the relay coil of relay 93 to bus 125 occurs by reason of the resulting closed circuit from switch 119 through diodes 119*a* and 119*b* and the relay coils of relays 87 and 90, respectively, to ground. The subsequent energization of the relay coils of relays 87 and 90 causes their respective armatures to contact the lower switch point thereof and produce a current flow from battery 96 through the armatures to the energizing coils of electromagnets 80 and 83, respectively. By definition, the direction of current flow from the positive terminal of battery 96 through these energizing coils produces a direction of transverse magnetization on the areas of tape 11 aligned with electromagnets 80 and 83** which represents the binary digit 1.

The current flow of battery 126 produced by closing coding switch 119 produces a simultaneous energization of the relay coil of relay 93. This energization of relay 93 closes its armature which, in turn, places the negative potential of battery 94, by way of bus 92, on the upper contact point of each of relays 87, 88, 89, and 90. This produces a current flow from battery 94 and bus 92 through the upper contact points and armatures of the unenergized relays 88 and 89 to the energizing coils of electromagnets 81 and 82, respectively. The current flow from the negative terminal of battery 94 through the energizing coils of electromagnets 81 and 82 produces a transverse magnetization of the areas of tape 11 aligned with electromagnets 81 and 82. The direction of magnetization of the tape areas aligned with electromagnets 81 and 82 is opposite to that of the tape areas aligned with electromagnets 80 and 83. Accordingly, the areas under electromagnets 81 and 82 receive a transverse magnetization representing the binary digit value of 0.

Thus, writing electromagnets 83, 82, 81 and 80 write the binary digits 1, 0, 0 and 1, respectively, representing the binary number 1001, the binary number equivalent to the decimal digit 9. In like manner, the operation of the remaining coding switches of keying system 98 may be understood by tracing the circuit connections from their contact points through various diodes to the relay busses.

As in the case for the device of Fig. 1, tape 11 must be indexed or afforded longitudinal movement after each recording operation. The indexing operation is provided for in the device of Fig. 3 by an electronic indexing mechanism generally designated 128. Indexing mechanism 128 includes a differentiating circuit comprising a series capacitor 130 and shunt resistor 131 connected between resistor 127 and the grid of a vacuum tube, such as triode 135. Differentiating resistor 131 is connected to the negative terminal of a source of direct current biasing potential such as a battery 132, the positive terminal of battery 132 being grounded. The anode of triode 135 is connected through a plate resistor 137 to the B+ terminal of a source of positive potential (not shown). A conventional amplifier 138 is connected between the plate of triode 135 and a stepping motor 142 which drives a roller 144 through a drive shaft 143. Roller 144 frictionally engages magnetic tape 11 and imparts longitudinal movement thereto.

Upon the actuation of a key in keyboard coding system 98, the resulting current flow from battery 126 passes through resistor 127 causing a negative potential drop thereacross, the waveform of the potential drop being designated 129. The differentiating circuit of capactior 130 and resistor 131 differentiates the fall and rise of the potential drop 129 into a negative and positive pulse, respectively, as illustrated by signal 134. Assume now that triode 135 is normally maintained at cutoff by the negative bias placed on its grid by battery 132. Consequently, the negative pulse of signal 134 has no effect on the triode's conduction, whereas the positive pulse of signal 134 is amplified, and appears on the anode of triode 135 as a negative pulse 136. Amplifier 138 further amplifies pulse 136 and pulse 139, appearing on the output of amplifier 138, actuatees stepping motor 142 for rotating shaft 143 a predetermined angular amount. The rotation of shaft 143 in turn drives tape 11, through drive roller 144, a longitudinal distance equal to the distance occupied by the group of writing electromagnets measured along the length of the tape. Stepping motor 142 may be of conventional type, and, as is apparent, the relationship between its angular rotation for each input pulse applied thereto and the diameter of rotor 144, must be such as to produce the desired longitudinal movement of tape 11.

As will be noted, all of the electromagnets of Fig. 3. are energized for recording each binary number. This operation is in contradistinction to the operation of the device according to Fig. 1 in which a writing magnet is unactuated when the binary digit 0 is to be recorded. The reason for this difference stems from the fact that if energization were applied only to the electromagnets whose corresponding place digits have one binary digit value, the unenergized electromagnets representing the other binary digit value would, nevertheless, be energized through magnetic induction in the same magnetic direction owing to the contigous placement of the electromagnets. In such a case, all areas under the group of electromagnets would have the same binary digit value recorded thereon. Therefore, it is necessary to positively energize each of the electromagnets in either one direction or the other to record the value of its respective binary digit.

Fig. 4 illustrates how binary numbers, magnetically recorded on tape 11, may be reproduced in the form of voltage levels, in which form, the binary numbers may be applied to the input-output device of a computer. In this reproduction, owing to the exact similarity between the recorded binary numbers, it is immaterial whether tape 11 has been recorded by the device according to Fig. 1 or by the device according to Fig. 3.

Tape 11 is afforded a longitudinal movement of constant velocity by any suitable driving mechanism, not shown. An electromagnetic transducer 150, preferably of horseshoe configuration, and having a pickup coil 151, is aligned with its two pole faces adjacent tape 11 but directed transversely to the direction of travel thereof. A pulse is induced in coil 151 whenever the direction of transverse magnetization of tape 11 passing under the pole faces of transducer 150 is reversed, as, for example, when the portion of tape 11 being scanned changes from a binary digit 1 representation to a binary digit 0 representation or from a binary digit 0 to a binary digit 1 representation. No output signal is produced by transducer 150 when the direction of magnetization of the length of tape being scanned remains constant since no differential lines of magnetic flux are cut by its pole faces. In this example, the winding of coil 151 is such that a positive pulse is produced by the binary digit 1 to 0 change and a negative pulse is produced by the binary digit 0 to 1 change. The signal produced by coil 151 of transducer 150, generally designated 156, is illustrated in Fig. 5*a*.

Coil 151 is coupled to the input of a bistable multivibrator or flip-flop 153 through an amplifier 152. The output signal of flip-flop 152 appears on an output terminal 154 and is generally designated 157 in Fig. 5*b*. Flip-flop 153 produces a high voltage level output signal upon receipt of a negative pulse from coil 151 and produces a low voltage level output signal upon receipt of a positive pulse from coil 151. As will be shown after, the high and low voltage levels of the signal output of flip-flop 153 represent the binary digits 1 and 0, respectively.

The area 79 of tape 11 illustrated in Fig. 4 is identical to area 79 of Fig. 2 and has recorded thereon the binary number 1001 representing the decimal digit 9. Transducer 150, in sensing the change from the binary digit 0 recorded to the right of the area 79*a* and the binary digit 1 recorded on area 79*a*, produces negative pulse 156*a* of signal 156. Pulse 156*a*, after amplification by amplifier 152, triggers flip-flop 153 into producing the high voltage level 157*a* of signal 157 on its ouput terminal 154.

Transducer 150 next produces positive pulse 156*b* of signal 156 when the magnetization change between areas 79*a* and 79*b* of tape 11 passes its pole faces and this positive pulse triggers flip flop 153 into producing the low voltage level 157*b* of signal 157. In a like manner, transducer 150 produces the remaining pulses of signal 156 and these pulses, in turn, actuate flip-flop 153 into producing the remaining voltage levels of signal 157. A comparison of signal 157 and the magnetization pattern on tape 11 reveals that the voltage levels of signal 157 are a potential representation of the direction of magnetization of the areas of tape 11, and, hence, ouput signal 157 of flip-flop 153 represents, in potential form, the original binary digits of the binary number recorded in magnetic form on tape 11. Accordingly, high voltage level 157*a* represents the binary digit 1 while each of the next two periods, 157*b* and 157*c* of low voltage level, represent the binary digit 0. The final high voltage level 157*d* represents binary digit 1 and the sequence of voltage levels appearing on output terminal 154, as derived from the magnetization of area 79 of tape 11, represents the binary number 1001, equivalent to decimal digit 9.

The device of Fig. 4 produces a sequence of output voltage levels representing a sequence of binary digits. No distinguishing characteristic appears in output signal 156 to mark off or separate the sequentially appearing digits into the binary numbers as were separately recorded. Such a marking could be provided if necessary, as for example, with a timing signal or marking signal although, for a majority of computer applications, the form of output illustrated in Fig. 5*b* is all that is required.

The necessity for mounting the permanent magnets of Fig. 1 and the electromagnets of Fig. 3 contiguous to one another, may most readily be explained in connection with the operation of the reproducing device illustrated in Fig. 4. If, for example, two binary digits 1 are to be recorded adjacent one another on tape 11, it is imperative that the lines of magnetic force of the two areas be identical and contiguous without any change of magnetization direction occuring between them. If any other direction of magnetization appeared, such as would be caused by having a space between adjacent permanent magnets or electromagnets, flip-flop 153 would be triggered momentarily into a low voltage level representing the binary digit 0 by reason of the difference in flux direction in this intermediate area. Flip-flop 153 would not then produce a potential representation on output terminal 154 of the two successive binary digits 1 as originally recorded. However, this undesired result is eliminated by mounting the adjacent electromagnets and adjacent permanent magnets contiguously and thereby eliminating any stray flux patterns between adjacent recorded tape areas.

In Fig. 1, the polarizing magnet 13 has been illustrated as producing a transverse magnetization of tape 11 with the writing magnets, when actuated, producing an exact reversal of this magnetic polarization. This pattern of magnetization produces the maximum possible output signal for each change of direction of the magnetic flux and, thus, is preferred. However, the magnetic polarization may be applied in any direction except the exact direction of magnetization applied by the writing magnets and an output signal still will be produced. The output signal, in such a case, will be progressively smaller as the two directions of flux approach each other.

As will be apparent to those skilled in the art, the embodiments according to Figs. 1 and 3 may take other forms without departing from the scope and spirit of this invention. For example, the number of writing magnets or electromagnets, as the case may be, may be increased or decreased if the number of binary digits in each binary number to be recorded is greater or smaller, respectively. Also, the invention may employ types of magnetic mediums other than the magnetic tape illustrated. For example, magnetic cylinders or discs may be utilized with corresponding changes in the indexing mechanisms disclosed to afford the new mediums the necessary intermittent movement.

The keyboard coding systems of Figs. 1 and 3 may likewise take other forms within the scope of this invention, as such systems providing a decimal-to-digital conversion are generally known. In the same manner, the indexing mechanisms disclosed may be varied without departing from this invention.

What is claimed as new is:

1. A device for magnetically recording the consecutive place digits of a binary number on a magnetic tape movable along a path, said device comprising: a series of magnetizing members extending along the path of movement of said tape and being aligned on one side of said tape and along a given length thereof, the magnetizing members of said series corresponding to the consecutive place digits, respectively, of the binary number, each of said magnetizing members including first and second poles disposed adjacent the opposite edges of said tape and being operable, when actuated, for magnetizing the area of the tape immediately aligned therewith transversely to the path of movement of said tape to represent one binary digit value; means for actuating the magnetizing members corresponding to the place digits of the binary number having said one binary digit value; actuable means for moving said magnetic tape a distance equal to said given length along the path; and means for actuating the tape moving means upon termination of the actuation of the magnetizing members.

2. A device for magnetically recording the consecutive place digits of a binary number on a magnetic track movable along a path, said device comprising: means for magnetically polarizing the magnetic track in a direction transverse to the path of movement of the track; a series of contiguous permanent magnets extending along the path of movement of the track and overlying a given length of the track, the permanent magnets of said series corresponding to the consecutive place digits, respectively, of the binary number, each of said magnets being operable, when actuated, for engaging the track and reversing the direction of the magnetic polarization on the area of the track thus contacted to represent one binary digit value; means for actuating the permanent magnets corresponding to the place digits of the binary number having said one binary digit value, the direction of said magnetic polarization on the track area underlying the unactuated permanent magnets representing the other binary digit value; actuable means for moving the magnetic track a distance equal to said given length along the path; and means for actuating the track moving means upon termination of the actuation of the magnet actuating means.

3. A device for recording the consecutive place digits of a binary number on a magnetic track movable along a path, said device comprising: a series of contiguous electromagnets extending along the path of movement of the track and aligned with a given length thereof, the electromagnets of said series corresponding to the consecutive place digits, respectively, of the binary number, each of said electromagnets being responsive to electrical energy applied thereto in first and second directions for magnetizing the area of the track aligned with said electromagnet in first and second directions, respectively, transversely to the path of movement of said track, respectively, to represent first and second binary digit values, respectively; first means for applying electrical energy in said first direction to the electromagnets corresponding to the place digits of the binary number having said first binary digit value; second means for simultaneously applying electrical energy in said second direction to the remaining electromagnets; actuable means for moving the track a distance equal to said given length along the path; and means responsive to the termination of the electrical energy applied by said first means for actuating the track moving means.

4. A device for magnetically recording decimal numbers as equivalent binary numbers on a magnetic track movable along a path, said device comprising: a series of contiguous magnetizing members extending along the path of movement of the track and aligned with a given length of the track, the magnetizing members of said series corresponding to the consecutive place digits, respectively, of the binary number, each of said magnetizing members being operable, when actuated, for magnetizing the area of the track aligned therewith transversely to the path of movement of the track to represent one binary digit value; a plurality of manually operable means representing different decimal numbers; means coupling each of said manually operable means to the magnetizing members corresponding to the place digits of the binary number having said one binary digit value, the binary number being equivalent to the decimal number represented by the corresponding manually operable means, each of the coupling means being responsive to the operation of its corresponding manually operable means for actuating the magnetizing member coupled thereto; actuable track moving means for moving the magnetic track along the path a distance equal to said given length; and means coupled between each of said manually operable means and the track moving means for actuating the track moving means upon termination of the actuation of said manually operable means.

5. A device for magnetically recording decimal numbers as equivalent binary numbers on a magnetic track movable along a path, said device comprising: means for magnetizing the magnetic track in one direction transverse to the path of movement thereof to represent one binary digit value; a series of contiguous permanent magnets extending along a given length of the track and normally spaced therefrom, the permanent magnets of said series corresponding to the consecutive place digits, respectively, of said binary number, each of said permanent magnets being operable when actuated to contact the track and reverse the direction of magnetization applied thereto by the first-named means to represent the other binary digit value; a plurality of manually operable means representing different digital members; means mechanically coupling each of said manually operable means to the permanent magnets corresponding to the place digits of the binary number having said other binary digit value, the binary number being equivalent to the decimal number represented by the corresponding manually operable means, each of the coupling means being responsive to the operation of its corresponding manually operable means for actuating the magnets coupled thereto; actuable track moving means for moving the magnetic track along the path a distance equal to said given length; and means for actuating the track moving means upon termination of the actuation of said manually operable means.

6. A device for recording decimal numbers as equivalent binary numbers on a magnetic track movable along a path, said device comprising: a series of contiguous electromagnets extending along the path of movement of said track and aligned with a given length of said track, said series of electromagnets corresponding to the consecutive place digits, respectively, of said binary number, each of said electromagnets being responsive to electrical energy applied thereto in first and second directions for magnetizing the portion of the track immediately thereunder in first and second directions, respectively, transverse to the path of movement of said track to represent first and second binary digit values, respectively; a plurality of manually operable means representing different digital numbers; a plurality of energizing means mechanically coupled to said plurality of manually operable means, respectively, each of said energizing means being responsive to the operation of its corresponding manually operable means for electrically energizing in said first direction the electromagnets corresponding to the place digits of the binary number having one binary digit value, the binary number being equivalent to the decimal number represented by the corresponding manually operable means; means responsive to the operation of each of said energizing means for simultaneously electrically energizing in said second direction the electromagnets unenergized by said energizing means; actuable means for moving the magnetic track along the path a distance equal to said given length; and means for actuating the track moving means upon termination of the operation of said manually operable means.

7. A device for magnetically recording the consecutive place digits of a binary number on a magnetic tape movable along a path, including, a plurality of magnetizing members disposed in contiguous and parallel relationship to one another along the path of movement of the tape, each of the magnetizing members having first and second poles defining a line disposed in transverse relationship to the path of movement of the tape, the first and second poles in each magnetizing member being movable into contiguous relationship to the same surface of the tape, means for normally maintaining each of the magnets at a position removed from the tape to prevent the magnets from recording signals on the tape, a plurality of members actuatable to represent different information, means for coupling different combinations of magnets to each actuatable member to produce a movement of these magnets into contiguous relationship with the tape for the recording of a particular pattern of magnetic information on the tape upon the actuation of the member, and means for advancing the tape to a new position upon the release of the actuatable members.

8. A device for magnetically recording the consecutive place digits of a binary number on a magnetic tape movable along a path, including, a plurality of magnetizing members disposed in contiguous and parallel relationship to one another along the path of movement of the tape, there being a number of magnets less than the different items of information to be recorded by the magnets on the tape for a use of different combinations of magnets to represent the different items of information, each of the magnetizing members having first and second poles defining a line disposed in substantially perpendicular relationship to the path of movement of the tape, the first and second poles in each magnetizing member being movable into contiguous relationship with the same surface of the tape, a plurality of arms each supporting a different magnetizing member in the plurality, means including the arms for normally maintaining the magnets at positions removed from the tape to prevent the magnets from recording signals on the tape, a plurality of members actuatable to represent different information and having legs for driving different combinations of arms to move different combinations of magnets into contiguous relationship with the tape for the recording of a particular pattern of magnetic information on the tape to represent the different items of information, and means for advancing the tape to a new position upon the release of the actuatable members.

9. A device for magnetically recording the consecutive place digits of a binary number on a magnetic tape movable along a path, including, a plurality of magnetizing members disposed in contiguous and parallel relationship to one another along the path of movement of the tape, each of the magnetizing members having first and second poles defining a line disposed in substantially perpendicular relationship to the path of movement of the tape and having the first and second poles movable into contiguous relationship with the tape on the same side of the tape, there being a number of magnets less than the different items of information to be recorded by the magnets on the tape for a use of different combinations of magnets to represent different items of information, a plurality of arms each connected to a different one of the magnetizing members and each biased to maintain the magnets out of magnetic proximity with the tape, a plurality of keys each depressable to represent a different item of information and each having legs for driving the arms and magnets in a direction for moving the magnets into magnetic proximity with the tape for the recording of a particular pattern of signals, means including a roller and a ratchet wheel coupled to the roller for advancing the tape, means including an arm coupled to all of the keys and a pawl attached to the arm and coupled to the ratchet wheel for advancing the tape through a distance at least as great as the combined widths of the magnetizing members upon the depression and subsequent release of one of the keys, and a magnetizing member disposed in contiguous relationship to the tape at a position before the plurality of magnetizing members and having first and second poles disposed on the same side of the tape and defining a line disposed in substantially perpendicular relationship to the path of movement of the tape to polarize the tape in a direction opposite to that produced by the magnetizing members in the plurality upon the movement of these magnetizing members into contiguous relationship with the tape.

10. A device for magnetically recording the consecutive place digits of a binary number on a magnetic tape movable along a path, including, a plurality of magnetizing members disposed in contiguous and parallel relationship to one another along the path of movement of the tape, each of the magnetizing members having first and second poles defining a line disposed in substantially perpendicular relationship to the path of movement of the tape and having the first and second poles movable into contiguous relationship with the tape, there being a number of magnets less than the different items of information to be recorded by the magnets on the tape for a use of different combinations of magnets to represent the different items of information, the first and second poles of each member being movable into contiguous relationship with the same surface of the tape, a plurality of arms pivotable in a first direction and coupled to the magnets for moving the magnets into contiguous relationship with the tape upon an actuation of the arms, means for biasing the arms to maintain the magnets in removed position relative to the tape, a plurality of keys each representing a different item of information and each having legs for actuating a different combination of arms upon a depression of the key, means including a roller for frictionally engaging the tape to drive the tape upon a rotation of the roller, means including a ratchet wheel coupled to the roller for driving the roller, an arm coupled to the keys for actuation upon a depression of any one of the keys, means for biasing the last mentioned arm in a direction opposite to the direction of actuation, and means including a pawl coupled to the last mentioned arm and operatively associated with the ratchet wheel for advancing the ratchet wheel upon an actuation of the arm and subsequent return of the arm to its normal position by the biasing means.

References Cited in the file of this patent

UNITED STATES PATENTS

| | | |
|---|---|---|
| 2,511,121 | Murphy | June 13, 1950 |
| 2,558,187 | Marrison | June 26, 1951 |
| 2,560,474 | Potts | July 10, 1951 |
| 2,561,476 | Lang | July 24, 1951 |
| 2,567,812 | Hickman | Sept. 11, 1951 |
| 2,608,346 | Hopkins | Aug. 26, 1952 |
| 2,616,169 | Cohen | Oct. 14, 1952 |

FOREIGN PATENTS

| | | |
|---|---|---|
| 887,900 | France | Aug. 23, 1943 |

OTHER REFERENCES

Magnetic Recording, Begun, 1949, pages 49–56.